US012230825B2

(12) United States Patent
Wernerus

(10) Patent No.: US 12,230,825 B2
(45) Date of Patent: Feb. 18, 2025

(54) BATTERY PACK FOR A HAND-HELD POWER TOOL, HAND-HELD POWER TOOL AND CHARGING DEVICE

(71) Applicant: Robert Bosch GmbH, Stuttgart (DE)

(72) Inventor: Holger Wernerus, Pliezhausen (DE)

(73) Assignee: Robert Bosch GmbH, Stuttgart (DE)

(*) Notice: Subject to any disclaimer, the term of this patent is extended or adjusted under 35 U.S.C. 154(b) by 162 days.

(21) Appl. No.: 17/758,584

(22) PCT Filed: Jan. 4, 2021

(86) PCT No.: PCT/EP2021/050010
§ 371 (c)(1),
(2) Date: Jul. 11, 2022

(87) PCT Pub. No.: WO2021/144153
PCT Pub. Date: Jul. 22, 2021

(65) Prior Publication Data
US 2023/0030391 A1 Feb. 2, 2023

(30) Foreign Application Priority Data
Jan. 13, 2020 (DE) .................... 10 2020 200 317.3

(51) Int. Cl.
*H01M 50/247* (2021.01)
*B25F 5/02* (2006.01)
(Continued)

(52) U.S. Cl.
CPC ............. *H01M 50/247* (2021.01); *B25F 5/02* (2013.01); *H01M 10/425* (2013.01);
(Continued)

(58) Field of Classification Search
CPC .................................................. H01M 50/247
See application file for complete search history.

(56) References Cited

U.S. PATENT DOCUMENTS

2011/0043170 A1 2/2011 Kim et al.
2013/0181681 A1* 7/2013 Mukai .................. H02J 7/0013
320/128
(Continued)

FOREIGN PATENT DOCUMENTS

DE 20 2008 012 599 U1 3/2010
DE 10 2013 226 232 A1 6/2014
(Continued)

OTHER PUBLICATIONS

International Search Report corresponding to PCT Application No. PCT/EP2021/050010, mailed Apr. 7, 2021 (German and English language document) (5 pages).

*Primary Examiner* — Daniel Jeremy Leeds
(74) *Attorney, Agent, or Firm* — Maginot, Moore & Beck LLP

(57) ABSTRACT

The disclosure relates to a battery back for a hand-held power tool comprising a battery pack housing. An interface of the battery pack housing has contact elements for contacting corresponding counter contact elements on the hand-held power tool and/or the charging device. A battery pack electronics system comprises a charge current path and a discharge current path. The charge current path is designed to connect the contact elements to the battery cell during a charging of the at least one battery cell, while the discharge current path is designed to connect the contact elements to the battery cell during a discharging of the at least one battery cell. The charge current path and the discharge current path are at least partially electrically separate from one another. The battery pack also comprises a first switch element for switching between at least the charge current path and the discharge current path.

18 Claims, 3 Drawing Sheets

(51) Int. Cl.
*H01M 10/42* (2006.01)
*H01M 10/44* (2006.01)
*H01M 50/204* (2021.01)
*H01M 50/296* (2021.01)
*H02J 7/00* (2006.01)

(52) U.S. Cl.
CPC ....... *H01M 10/441* (2013.01); *H01M 50/204* (2021.01); *H01M 50/296* (2021.01); *H02J 7/0063* (2013.01); *H01M 2220/30* (2013.01)

(56) References Cited

U.S. PATENT DOCUMENTS

2016/0156206 A1* 6/2016 Yamaji ................... H02H 3/044
320/112
2016/0172722 A1 6/2016 Rejman et al.
2016/0248075 A1 8/2016 Cruise et al.

FOREIGN PATENT DOCUMENTS

DE 10 2016 124 500 A1 6/2018
EP 3 226 376 A1 10/2017

* cited by examiner

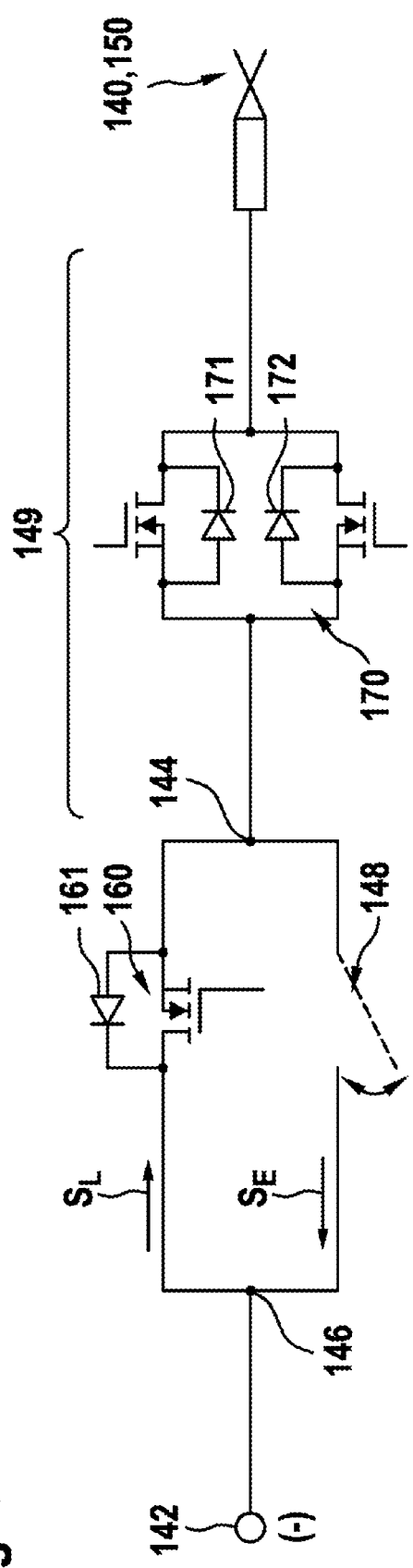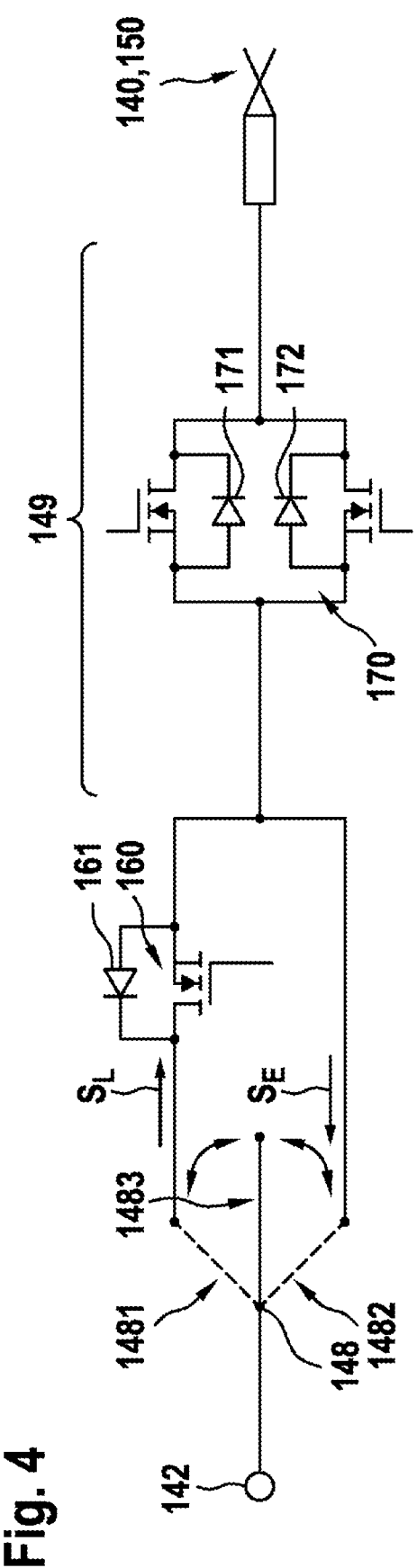

BATTERY PACK FOR A HAND-HELD POWER TOOL, HAND-HELD POWER TOOL AND CHARGING DEVICE

This application is a 35 U.S.C. § 371 National Stage Application of PCT/EP2021/050010, filed on Jan. 4, 2021, which claims the benefit of priority to Serial No. DE 10 2020 200 317.3, filed on Jan. 13, 2020 in Germany, the disclosures of which are incorporated herein by reference in their entirety.

The present disclosure relates to a battery pack for a hand-held power tool, as well as to a hand-held power tool, to a charging device, and to a tool system.

BACKGROUND

Electric hand-held power tools are known in principle and are supplied with power via a mains connection. Alternatively, battery-powered devices allow a high degree of flexibility when working, as they are independent of mains power in particular. In this way, for example, outdoor work can also be carried out conveniently, and therefore it is often intended to use battery packs when operating a hand-held power tool.

Within the scope of this application, a battery pack is thus to be understood as a battery assembly preferably consisting of a plurality of electrically interconnected battery cells, which can store electrical energy, supplies the energy required for the operation of a hand-held power tool, and can be exchangeably installed in a chamber, an interface or the like of the hand-held power tool or the charging device. In particular, an interface is to be understood as a device which is intended to establish an electrical and, in particular, a mechanical connection to a charging device and/or a discharge side, i.e. the hand-held power tool, directly or indirectly.

Such battery packs are known in principle and generally comprise a plurality of rechargeable batteries connected in parallel and/or series, for example three cylindrical Li-ion cells connected in series, each with 3.6 V, for example, and a total voltage of 10.8 V. The connected battery cells are connected on the one hand to each other and on the other hand to a battery pack electronics system, which includes other circuit components in addition to the battery cells. Among other things, the battery pack electronics system is tasked with controlling the charging and discharging processes of the battery pack depending on parameters such as maximum permissible charge and discharge currents, cell temperature, and other variables.

The battery pack usually further comprises a battery pack housing, in which the battery cells are preferably accommodated either completely or partially by means of a cell holder. Alternatively, the cell holder itself forms a battery pack housing element of the battery pack housing.

The battery pack is coupled to the hand-held power tool by plugging or pushing the interface of the battery pack into a complementary socket of the device housing. To prevent the battery pack from coming loose, for example due to vibrations during operation of the hand-held power tool, the interface is typically equipped with a latching mechanism.

The interface also has contact slots, in which contact elements can be arranged. The contact elements are in turn connected to the battery pack electronics system. If the energy of the battery pack is used up, it can be removed and connected to a charging station with corresponding mating contact elements. If a plurality of battery packs are available, it is possible to remove the discharged battery pack from the hand-held power tool and to replace it with a charged one. As a rule, the rated voltage and capacity of the particular battery pack being used determine the performance and runtime of the hand-held power tools.

Both the battery packs and the hand-held power tools and charging devices, and thus the respective interfaces, are subject to constant further development, wherein it is common for additional contact elements and mating contact elements to be implemented in the interfaces in order to exchange additional information between the devices. Here, it is desirable to keep the installation space required for the interface as compact as possible for reasons of handiness and manageability of both the battery pack and the hand-held power tool. In addition, for reasons of compatibility with predecessor models, there may be a requirement to change the geometry of the interface as little as possible compared to a predecessor model. For this reason, among others, hand-held power tools, battery packs and charging devices contain coordinated mechanical or electrical coding elements that limit the possible combinations of battery packs and hand-held power tools or charging devices for compatibility reasons.

At least two of the contact elements are connected here to the highest and lowest potential of the interconnected cells, i.e. to battery (+) and ground, via which current can be drawn from or supplied to the battery pack. For reasons of cost savings and in order to achieve a compact installation space of the interface, the charging and discharging process preferably runs via the same contact elements, but implementations with separate charging and discharging contacts are also known.

However, due to increasing demands on the safety of a battery pack, it is also desirable to be able to switch off both charge and discharge currents. Metal-oxide-semiconductor field-effect transistors (MOSFETs) are ideal for this purpose due to their high current-carrying capacity and low resistivity. However, MOSFETs have a parasitic body diode, which is why only one current direction can be blocked at a time, depending on the polarity.

The battery pack compatibility requirement described above, and the resulting need to avoid interface geometry changes, has proven be problematic with respect to the need for increased safety and the limited possibility to achieve separate charge and discharge current cutoff without modification of the battery pack interface.

SUMMARY

It is the object of the disclosure to improve the above-mentioned disadvantages and to provide an improved battery pack of the type mentioned at the outset, which, while maintaining a configuration of the battery pack interface with the same contact elements for charging and discharging, achieves an increased level of safety in battery operation.

This object is achieved by a battery pack according to the disclosure. Advantageous embodiments, variants and developments can be inferred from the disclosure.

A battery pack according to the disclosure for a hand-held power tool comprises a battery pack housing with an interface for establishing a mechanical and electrical connection of the battery pack to the hand-held power tool and/or a charging device, wherein the interface comprises at least a first contact element and a second contact element for making electrical and/or mechanical contact with corresponding mating contact elements on the hand-held power tool and/or corresponding mating contact elements on the charging device. Furthermore, the battery pack according to the disclosure comprises at least one battery cell and a battery pack electronics system. The battery pack electronics system comprise a charge current path and a discharge current path. The charge current path is configured to connect the first contact element and the second contact element to the battery cell during a charging of the at least one battery cell, while the discharge current path is configured to connect the first contact element and the second contact element to the battery cell during a discharging of the at least one battery cell. The charge current path and the discharge current path are at least partially electrically separated from each other. Furthermore, the battery pack comprises a first switching element for switching between at least the charge current path and the discharge current path.

While maintaining a minimal interface configuration with identical contact elements for the charging and discharging process, the disclosure makes it possible to at least partially separate the charge and discharge current paths from one another and thus to embody them differently. This possibility makes it possible, among other things, to achieve an increased level of safety for the battery pack.

Furthermore, it is advantageous that current limiters, for example MOSFETs, can be inserted in the charge and discharge current paths in advantageous polarity in order to be able to switch off the charge and discharge currents in this way, in particular to be able to switch them off separately. The at least partial separation of the charge and discharge current paths also makes it possible to dispense with an anti-serial MOSFET circuit in the discharge current path, which on the one hand saves costs and on the other minimizes the power loss due to additional electrical components that are energized during operation of the hand-held power tool.

Other, not explicitly mentioned and individually advantageous circuitry possibilities for the charge and discharge current path, for example aiming at extended functionality, are also possible.

The use and extension of existing mechanical mechanisms further enables compatibility with existing equipment, i.e. hand-held power tool machines and charging devices, which is an advantage for end users who want to extend an existing set of equipment or battery packs.

In one embodiment of the disclosure, the interface comprises a first mechanism for actuating the first switching element. While the first mechanism may be a user-operated mechanism, such as a switch located at a suitable but otherwise arbitrary location on the battery pack housing, in one embodiment of the disclosure, the first mechanism is integrated into the interface of the first battery pack such that the first mechanism actuates the first switching element when the battery pack is connected to a corresponding interface of the hand-held power tool and/or charging device via the interface.

In this way, the battery pack automatically switches to the desired mode, i.e. charging or discharging, when it is inserted into the hand-held power tool or into the charging device, without the user having to make a conscious switch.

In one embodiment of the disclosure, the first switching element as well as the first mechanism are designed such that, in a basic state, in which the interface of the battery pack is not connected to a corresponding interface of the hand-held power tool and/or the charging device, the discharge current path or the charge current path are switched. As will be explained in more detail later, switching between the discharge current path and the charge current path can be implemented particularly easily in this way.

In one embodiment of the disclosure, the first mechanism is configured such that the first switching element switches the discharge current path when the battery pack is connected to the hand-held power tool via the interface.

In one embodiment of the disclosure, the first mechanism is configured such that the first switching element switches the charge current path when the battery pack is connected to the charging device via the interface.

Preferably, the charge current path and the discharge current path comprise a common portion, wherein the common portion comprises at least one first current limiter, and wherein the at least one first current limiter is designed to switch off a discharge current when a limit value, in particular a limit value of the discharge current and/or a limit value of the temperature, is exceeded. In embodiments of the disclosure, the at least one first current limiter may comprise n-type MOSFETs for which the current carrying capacity is designed for the expected discharge current. With regard to its polarity, the at least one first current limiter is advantageously incorporated in the common portion such that, depending on the design of the current limiter, parasitic elements possibly present, such as the aforementioned body diode in the case of MOSFETs, do not impede a switch-off of the discharge current.

In one embodiment, the charge current path comprises at least one second current limiter, wherein the at least one second current limiter is designed to switch off a charge current when a limit value, in particular a limit value of the charge current, and/or a limit value of the temperature, and/or a limit value of the cell voltage is exceeded. Similarly to the at least one first current limiter, the at least one second current limiter in embodiments of the disclosure may comprise n-type MOSFETs.

In one embodiment, the first switching element is arranged in the discharge current path, wherein the first switching element and the second current limiter connected in parallel.

In one embodiment, the first switching element is designed to bypass the at least one second current limiter when the first switching element switches the discharge current path. In this way, current flow to the second current limiter associated with power dissipation is avoided during discharge of the battery pack.

In one embodiment, the first switching element is designed to switch between the charge current path, the discharge current path and a neutral state, wherein the at least one battery cell is electrically isolated from the first contact element and/or second contact element in the neutral state. The fact that both the charge and discharge current paths are separated from the contact element in the neutral state results in a particularly high level of safety for the battery pack, for example with regard to unintentional discharging.

In one embodiment, the at least one first current limiter and/or the at least one second current limiter is an electrical component selected from the group consisting of bipolar transistors (BJT), field-effect transistors (FET), and metal-oxide-semiconductor field-effect transistors (MOSFET), in particular n-type MOSFET.

According to another aspect, the disclosure comprises a hand-held power tool comprising an electric motor, a machine-side interface for mechanically and electrically coupling the hand-held power tool to a corresponding interface of a battery pack, and a battery pack as described above. In this case, the machine-side interface is designed such that the first mechanism of the battery pack switches the discharge current path via the first switching element when the battery pack is connected to the machine-side interface of the hand-held power tool.

Further, the disclosure comprises a charging device for electrically charging a battery pack as described above, comprising a device-side interface for mechanically and electrically coupling the charging device to a corresponding interface of the battery pack, wherein the device-side interface is configured such that the first mechanism of the battery pack switches the charge current path via the first switching element when the battery pack is coupled to the device-side interface.

According to another aspect, the present disclosure comprises a tool system comprising a battery pack as described above, a hand-held power tool as described above, and a charging device as described above.

Further features, possible applications and advantages of the disclosure will result from the following description of the exemplary embodiments of the disclosure, which are shown in the figures. It should be noted here that the features shown are merely of a descriptive nature and may also be used in combination with features of other further developments described above and are not intended to limit the disclosure in any way.

BRIEF DESCRIPTION OF THE DRAWINGS

The disclosure will be described in more detail below with reference to the accompanying figures, wherein the same reference signs are used for the same features. The drawings are schematic and show:

FIG. 3 a schematic view of a circuit in a battery pack according to an embodiment of the disclosure, the circuit comprising a charge current path and a discharge current path; and FIG. 4 a schematic view of a circuit in a battery pack according to a further embodiment of the disclosure, the circuit comprising a charge current path and a discharge current path.

DETAILED DESCRIPTION

Figure 1:
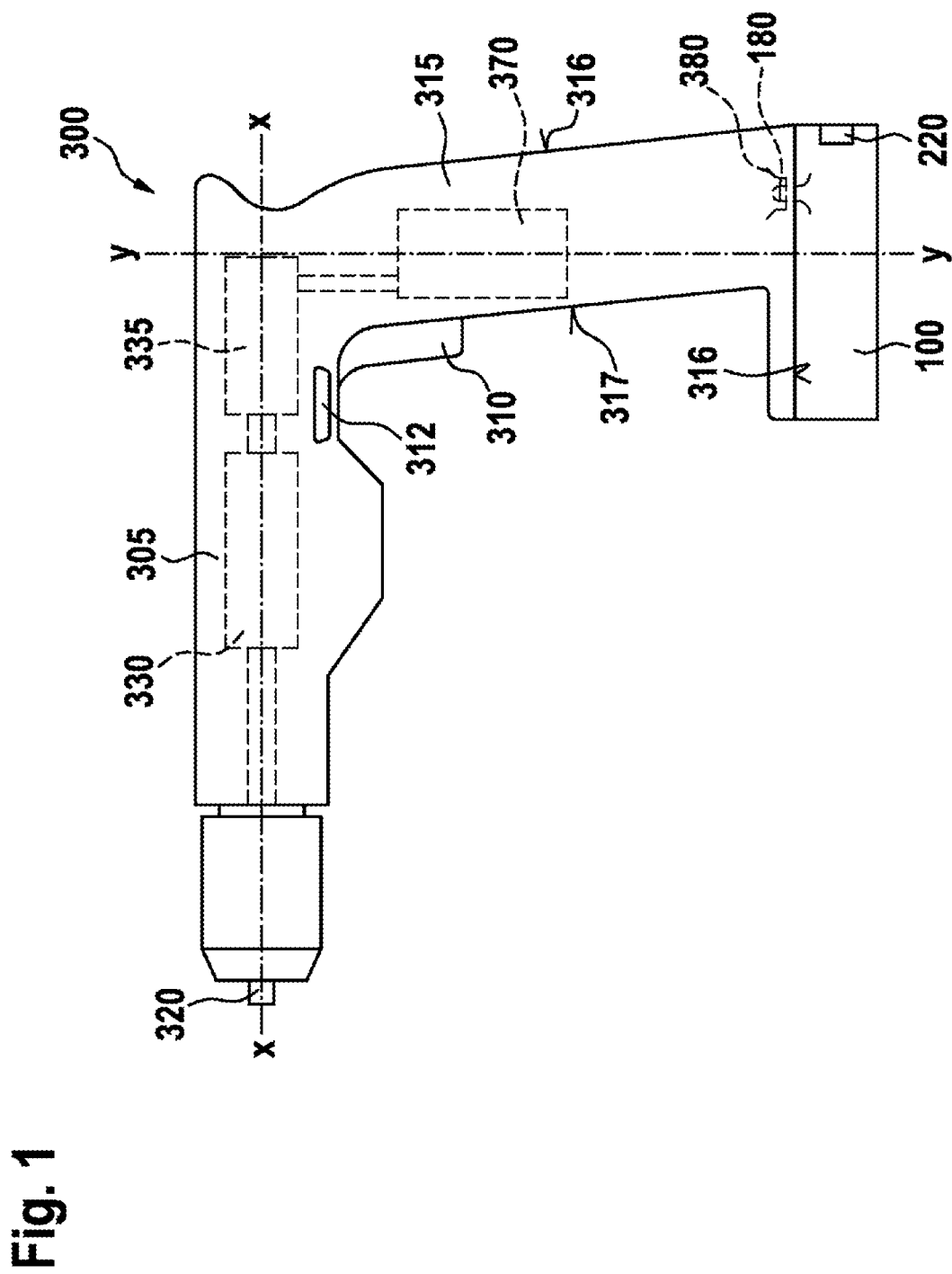
FIG. 1 an exemplary view of a hand-held power tool with a battery pack according to an embodiment of the disclosure.

FIG. 1 shows a hand-held power tool 300 according to an embodiment of the disclosure, said hand-held power tool being designed by way of example as a cordless drill. Accordingly, in the embodiment shown, the hand-held power tool 300 is mechanically and electrically connected to a battery pack 100 for mains-independent power supply. However, it should be noted that the present disclosure is not limited to cordless drills, but rather can be applied to various hand-held power tools 300. The hand-held power tool 300 comprises a transmission 330 disposed in a housing 305 for transmitting a torque generated by a drive motor 335 to a drive shaft rotating about an axis x, to which a tool holder 320 for a tool (not shown) is attached, and a handle 315. An electronics system 370 is disposed within the housing 305 and is in electronic and/or mechanical contact with the drive motor 335 and/or the transmission 330.

The handle 315 serves as a support surface for a hand of an operator of the hand-held power tool 300 and generally has a longitudinal axis y, a front side 317 facing along an axis x toward the tool receptacle 320, a rear side 316, and two side faces 318.

In the region of the handle 315, there is arranged a first operating element 310 for the power supply of the drive motor 335, wherein the first operating element 310 protrudes from the housing 305 in a manner that is manually accessible to the user, so that, in a manner known per se, an open-loop and/or closed-loop control of the drive motor can be made possible by a pressing movement of the first operating element 310, preferably in dependence on the adjustment path of the first operating element 310, and also the power supply for the drive motor 335 can be switched on and/or off. Furthermore, the hand-held power tool 300 comprises a second operating element 312 in the form of a slide switch for adjusting the direction of rotation of the drive motor 335 of the hand-held power tool 300. The second operating element 312 is arranged so as to be displaceable perpendicularly to the axis of rotation x of the drive shaft, in particular of the tool holder 320 of the hand-held power tool 300, so that the second operating element 312 can be moved back and forth between a first position, a second position and a third position when actuated. Here, the first and second positions each define a direction of rotation of the drive motor. Thus, the user of the hand-held power tool 300 can already tell from the positions of the second switching element 312 in which work mode the hand-held power tool 300 is operating. In addition, the second switching element has a third position, for example a middle position, between the first position and the second position, wherein an electrical, electromechanical and/or mechanical interruption of the motor current occurs in the third position. For example, the operation of the first switching element 310 may be mechanically locked, wherein the second operating element 312 has a locking effect on the first switching element 310 when moved to a third position. In this regard, the second operating element 312 may be configured as a slide switch as shown or alternatively as a toggle switch.

The first operating element 310 and the second operating element 312 are arranged along the axis of rotation x such that it is possible to operate both the first and the second operating elements 310, 312 using the index finger or middle finger. Here, the distance between the first operating element 310 and the second operating element 312 is selected such that one-handed operation of the hand-held power tool 300 is possible. Both operating elements 310, 312 are further arranged in a region below the axis of rotation x and protrude from the housing 305.

In the position shown in FIG. 1, the battery pack 100 is attached to the handle 315 of the hand-held power tool 300 and locked by locking means. By arranging the battery pack 100 below the handle 315, operation of the hand-held power tool 300 is not disturbed. The locking means, which are not shown in detail, include, but are not limited to, a locking element and an actuating element 220. By actuating the actuating element 220, the battery pack 100 can be released from the handle 315 of the hand-held power tool 300. Further, the hand-held power tool 300 comprises an interface 380.

Figure 2:
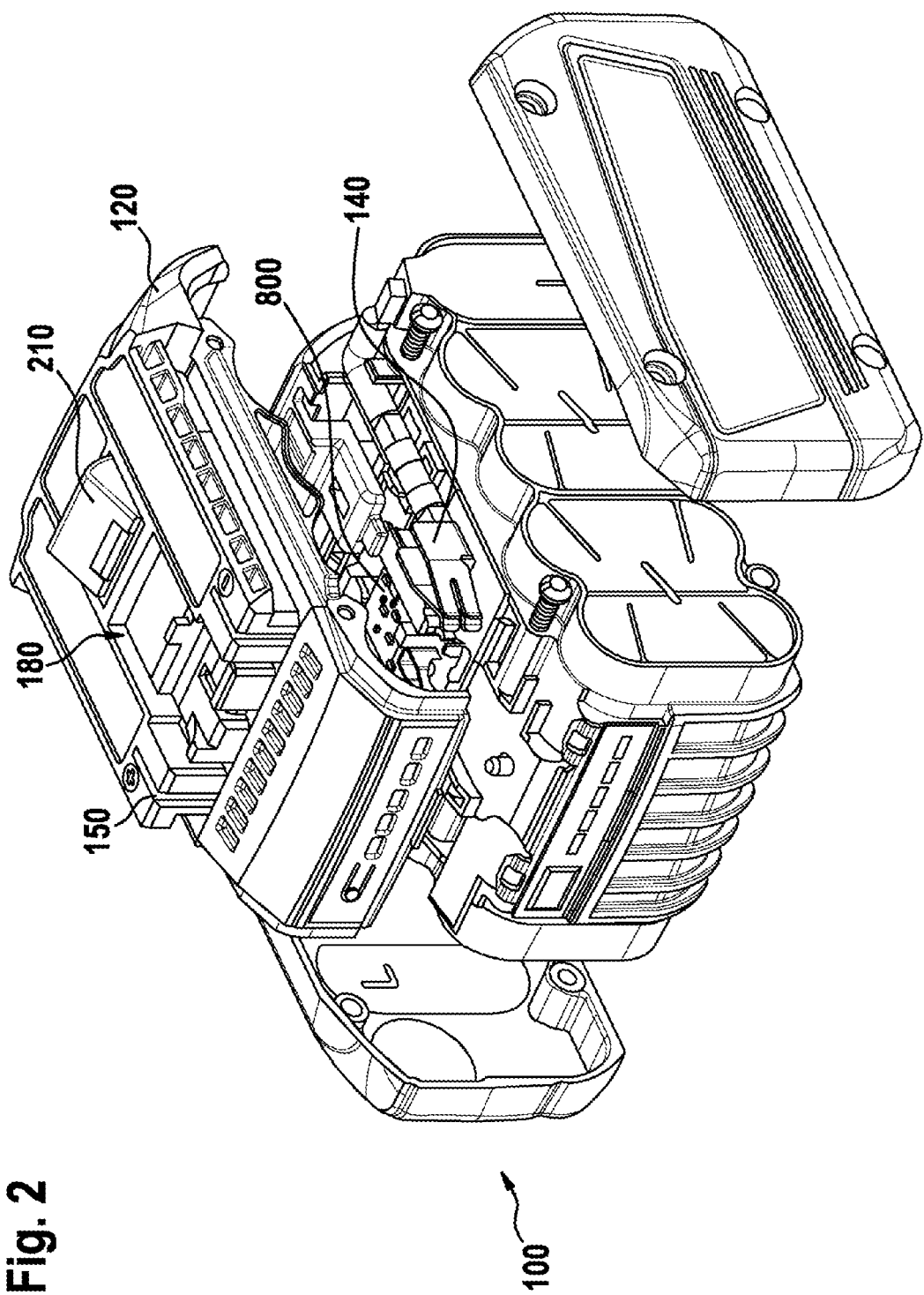
FIG. 2 a perspective exploded view of a battery pack according to an embodiment of the disclosure.

According to an embodiment of the disclosure, the battery pack 100 shown in FIGS. 1 and 2 is designed as a sliding battery pack, and comprises an interface 180 corresponding to the interface 380 of the hand-held power tool 300. As an alternative to the sliding battery pack, a design as a rotating or swiveling battery pack is also possible, wherein the battery pack 100 can be detachably locked to the housing 305 of the hand-held power tool 300 on the side opposite the swiveling axis by latching, screwing, clamping or bracing.

In this way, it is possible to effectively counteract a situation in which the battery pack might fall off from the housing 305.

For detachable fitting of the battery pack 100 on a hand-held power tool 300 or on a charging device, the battery pack 100 comprises an interface 180 for detachable mechanical and electrical connection to a corresponding interface 380 of the hand-held power tool 300 or a corresponding interface of the charging device. When fitting the battery pack 100, receiving means, for example guide grooves and guide ribs, of the hand-held power tool 300 or of the charging device for receiving the corresponding guide elements of the battery pack 100 are brought into engagement therewith, wherein the battery pack 100 is inserted along the receiving means and the interface 180 of the battery pack 100 is pushed into the corresponding interface 380 of the hand-held power tool 300 or the corresponding interface of the charging device. The battery pack 100 can be associated with the hand-held power tool 300 and/or the charging device via the interfaces 180, 380.

As can be seen in FIG. 2, the interface 180 additionally comprises contact elements for electrically contacting the battery pack 100 with the hand-held power tool 300 or the charging device. The contact elements are designed either as voltage contact elements and serve as charging and/or discharging contact elements, or as signal contact elements, that enable signal transmission from the battery pack 100 to the hand-held power tool 300 or the charging device and/or from the hand-held power tool 300 or the charging device to the battery pack 100. The interface 180 comprises at least a first contact element 140 and a second contact element 150 for electrically contacting corresponding mating contact elements on the hand-held power tool 300 and/or corresponding mating contact elements on the charging device. These contact elements 140, 150 are therefore voltage contact elements. The contact elements 140, 150 are each connected to the highest or lowest potential of at least one, but usually a plurality of, interconnected battery cells, i.e. to battery (+) and ground, so that current can be drawn from or supplied to the battery via the contact elements 140, 150. A person skilled in the art recognizes in the exploded view of FIG. 2 that the reference sign 150 marks the position at which the contact element 150 is contacted by the corresponding mating contact element through the battery pack housing when the battery pack 100 is assembled.

As shown in FIG. 2, the first contact element 140 and the second contact element 150 are connected to a battery pack electronics system 800, which may be configured to perform certain switching and control operations of the battery pack 100. Among other things, the battery pack electronics system 800 is configured to connect the first contact element 140 and the second contact element 150 to the battery cell via a charge current path during a charging of the at least one battery cell. In addition, the battery pack electronics system 800 is configured to connect the first contact element 140 and the second contact element 150 to the battery cell via a discharge current path during a discharging of the at least one battery cell.

To lock the battery pack 100 to the handle 315 of the hand-held power tool 300, the battery pack 100 is slid along the handle 315, more specifically along a lower outer surface of the handle 315 oriented substantially perpendicular to the longitudinal direction y of the handle 315. In the position shown in FIG. 1, the battery pack 100 is locked to the handle 315 by locking means. The locking means include, but are not limited to, a locking element 210 shown in FIG. 2 and an actuating element 220. By actuating the actuating element 220, the battery pack 100 can be released from the handle 315 of the hand-held power tool 300. After unlocking the battery pack 100, the battery pack 100 can be separated from the handle 315. When the battery pack 100 is attached to a hand-held power tool 300, the locking element 210 is engaged with a corresponding receptacle in the handle 315 of the hand-held power tool 300, which is not shown in greater detail.

As mentioned at the outset, the disclosure makes it possible, while retaining a known interface configuration, for example the interface 180 shown in FIG. 2, with identical contact elements 140, 150 for the charging and discharging processes, to at least partially separate the charge and discharge current paths from one another and thus to embody them differently.

In this regard, FIGS. 3 and 4 show a part of the battery pack electronics system 800, and a part of the charge current path and discharge current path from the contact element 140 to the at least one battery cell, shown here by a corresponding battery contact 142. The part of the charge current path and of the discharge current path leading from the other potential of the at least one battery cell to the contact element 150 is not shown. However, a person skilled in the art will recognize that, in the simplest case, this part may simply be a continuous electrical connection. Alternatively, the part of the charge current path and the discharge current path leading from the other potential of the at least one battery cell to the contact element 150 may be of equivalent design to the part shown in FIGS. 3 and 4.

In the circuit shown in FIG. 3, the contact element 140 is connected to the battery contact 142 of the battery pack 100 via the charge current path and the discharge current path, as already mentioned. A current direction when discharging the battery pack is indicated by an arrow $S_E$, and a current direction when charging the battery pack is indicated by an arrow $S_L$.

A person skilled in the art will recognize that the charge current path and the discharge current path are electrically separated from each other between the nodes 144 and 146, and include common portions outside of this region.

A first current limiter 170 is arranged in a common portion, which in the present embodiment is a MOSFET. The at least one first current limiter 170 is designed in the figure as an n-type MOSFET and is configured to switch off the discharge current when a limit value is exceeded, in particular a limit value of the discharge current and/or a limit value of the temperature. Accordingly, its current carrying capacity is designed for the expected discharge current. Also shown are the parasitic body diodes 171, 172 of the MOSFETs 170, which allow current flow in the direction of the charge current even in the case where the first current limiter 170 turns off the discharge current, which is unsatisfactory.

In the embodiment shown, the charge current path therefore comprises a second current limiter 160, also shown as a MOSFET in FIG. 3, wherein the second current limiter 160 is configured to switch off the charge current when a limit value is exceeded, in particular a limit value of the charge current, and/or a limit value of the temperature, and/or a limit value of the cell voltage. Accordingly, its current-carrying capacity is designed for the expected charge current. The body diode 161 of the second current limiter 160 is oriented such that it does not allow current to pass through when the charge current is switched off. A person skilled in the art will recognize that the first current limiter 170 and the second current limiter 160 are anti-serially connected in the charge current path.

A first switching element 148 is used to switch between the charge current path and the discharge current path. The switching element 148 is disposed in the discharge current path, wherein the first switching element 148 and the second current limiter 160 are connected in parallel between the nodes 144 and 146. Accordingly, the first switching element 148 bypasses the second current limiter 160 when the first switching element 148 switches the discharge current path, and passes the potentially high discharge current therethrough. Details regarding the actuation of the switching element will be discussed later.

The disclosure makes it possible to switch charge and discharge currents with individual current limiters 170, 160, even when charging and discharging of the battery pack 100 occurs via the same contact elements 140, 150. At the same time, the solution according to the disclosure avoids an anti-serial MOSFET circuit in the discharge current path, thus keeping both cost and power dissipation due to additional components energized during operation of the handheld power tool 300 low.

With respect to the execution of the switching by the switching element 148, it may be provided that it is performed manually by a user, for example by a switch connected to the battery pack electronics 800 on the outside of the battery pack housing. Alternatively, or in addition, digital technology based on radio, infrared, light, or magnetism may be used to actuate the switch 148 when the battery pack is connected to the hand-held power tool 100 or the charging device, wherein the corresponding interface must also have appropriate technology, such as a radio emitter or receiver.

In an alternative embodiment of the disclosure that is advantageous in terms of compatibility with conventional devices, the interface 180 includes a first mechanism (not shown) for actuating the first switching element 148. Here, the first mechanism may be integrated into the interface 180 of the first battery pack 100 such that the first mechanism actuates the first switching element 148 when the battery pack 100 is connected to a corresponding interface of the hand-held power tool 300 and/or the charging device via the interface 180. In this manner, automatic switching is enabled when the user uses the battery pack in the hand-held power tool or charging device, and the corresponding mode of operation, i.e., discharging or charging, is actuated in each case. Accordingly, in an embodiment of the disclosure, the first switching element 148 and the first mechanism are configured such that, in a basic state, in which the interface 180 of the battery pack 100 is not connected to a corresponding interface of the hand-held power tool 300 and/or the charging device, the discharge current path or the charge current path are switched.

In the case where the charge current path is switched in the basic state, the first mechanism is configured such that the first switching element 148 switches the discharge current path when the battery pack 100 is connected to the hand-held power tool 300 via the interface 180. In turn, the first mechanism may be actuated in this regard by, for example, a mechanism integrated into the interface 380 of the hand-held power tool 300, such as the latching mechanism or mechanical coding elements already arranged on conventional hand-held power tools 300. When the battery pack 100 is disconnected again from the hand-held power tool 300, the first mechanism switches the charge current path again via the switching element 148. Thus, in this embodiment, it is not necessary for the first mechanism to be actuated when the battery pack is connected to the charging device.

Alternatively, in the case where the discharge current path is switched in the default state, the first mechanism may be configured to cause the first switching element 148 to switch the charge current path when the battery pack 100 is connected to a charging device via the interface 180. In turn, the first mechanism may be actuated here by, for example, a mechanism integrated into the charging device interface, such as the latching mechanism or mechanical coding elements already arranged on conventional charging devices. When the battery pack 100 is disconnected again from the charging device, the first mechanism switches the discharge current path again via the switching element 148. Thus, in this embodiment, it is not necessary for the first mechanism to be actuated when the battery pack is connected to the hand-held power tool 300.

In the embodiment shown in FIG. 3, the battery cell or the battery contact 142 is always electrically connected to the contact element 140, unless the first 170 and second current limiters 160 switch off.

By contrast, in a further embodiment shown in FIG. 4, the first switching element 148 is configured to switch between the charge current path, the discharge current path, and a neutral state, wherein in the neutral state the at least one battery cell is electrically disconnected from the first contact element 140. In FIG. 4, the neutral state is represented by a switch position 1483 of the first switching element 148, while in a switch position 1481 of the first switching element 148 the charge current path is switched, and in a switch position 1482 of the first switching element 148 the discharge current path is switched. In general, identical reference signs are used in FIGS. 3 and 4 for identical features.

A person skilled in the art will recognize that in the switching position 1481, in which the charge current path is switched, the charge current is conducted via the first current limiter 170 as well as via the second current limiter 160, and that the first current limiter 170 and second current limiter 160 are arranged anti-serially in the charge current path. In the switching position 1482, in which the discharge current path is switched, the discharge current is routed past the second current limiter 160 so that the power dissipation is not unnecessarily increased, as already explained in conjunction with FIG. 3.

It should be mentioned that in the circuit shown in FIG. 4, the switching element 148 is not arranged in parallel with the second current limiter 160, but in series.

As described in conjunction with FIG. 3, in one embodiment of the disclosure, the first mechanism switches the switching element 148 in the circuit shown in FIG. 4 to the discharge current path and the charge current path, and in addition thereto to the neutral state. In this case, the neutral state is switched in the basic state of the battery pack, while the first mechanism is designed to cause the first switching element 148 to switch the discharge current path when the battery pack 100 is connected to the hand-held power tool 300 via the interface 180. The first mechanism is further configured to cause the first switching element 148 to switch the charge current path when the battery pack 100 is connected to a charging device via the interface 180.

Accordingly, in conjunction with this embodiment, the machine-side interface 380 of the hand-held power tool 300 is configured such that the first mechanism of the battery pack 100 switches the discharge current path via the first switching element 148 when the battery pack 100 is connected to the machine-side interface 380 of the hand-held power tool 300. Similarly, the charging device interface is configured such that the first mechanism of the battery pack 100 switches the charge current path via the first switching element 148 when the battery pack 100 is connected to the machine-side interface of the charging device.

With respect to obvious alternatives for pairing the battery pack 100 with the hand-held power tool 300 or charging device, it should also be noted with respect to actuation of the switching element 148 that this can be achieved by, for example, corresponding Bluetooth identifiers of the hand-held power tool 300 and the battery pack 100, or magnetic triggers.

Although the disclosure has been explained in more detail by the preferred exemplary embodiments, other combinations of the stated features may be provided by a person skilled in the art without departing from the scope of protection of the disclosure.

The invention claimed is:

1. A battery pack for a hand-held power tool, the battery pack comprising:
    a battery pack housing with an interface configured to establish a mechanical and electrical connection of the battery pack to at least one of the hand-held power tool and a charging device, the interface having at least a first contact element and a second contact element configured to make electrical contact with at least one of corresponding mating contact elements on the hand-held power tool and corresponding mating contact elements on the charging device;
    at least one battery cell;
    a battery pack electronics system having a charge current path and a discharge current path, the charge current path being configured to connect the first contact element and the second contact element to the at least one battery cell during a charging of the at least one battery cell, the discharge current path being configured to connect the first contact element and the second contact element to the at least one battery cell during a discharging of the at least one battery cell, the charge current path and the discharge current path being at least partially electrically separated from each other; and
    a first switching element configured to switch between at least the charge current path and the discharge current path,
    wherein the charge current path and the discharge current path have a common portion and the common portion includes at least one first current limiter,
    wherein the at least one first current limiter is configured to switch off a discharge current when a first limit value is exceeded,
    wherein the at least one first current limiter includes a first metal-oxide-semiconductor field effect transistor (MOSFET) and a second MOSFET connected in parallel, and
    wherein a first parasitic body diode of the first MOSFET and a second parasitic body diode of the second MOSFET are configured to allow current flow in a direction of the charging current even when the first current limiter switches off the discharge current.

2. The battery pack as claimed in claim 1, wherein the interface comprises a first mechanism configured to actuate the first switching element.

3. The battery pack as claimed in claim 2, wherein the first mechanism is integrated into the interface of the battery pack such that the first mechanism actuates the first switching element when the battery pack is connected to a corresponding interface of at least one of the hand-held power tool and charging device via the interface.

4. The battery pack as claimed in claim 2, wherein the first switching element and the first mechanism are configured such that, in a basic state, in which the interface of the battery pack is not connected to a corresponding interface of at least one of the hand-held power tool and the charging device, one of the discharge current path and the charge current path is switched.

5. The battery pack as claimed in claim 3, wherein the first mechanism is configured such that the first switching element switches the discharge current path when the battery pack is connected to the hand-held power tool via the interface.

6. The battery pack as claimed in claim 3, wherein the first mechanism is configured such that the first switching element switches the charge current path when the battery pack is connected to the charging device via the interface.

7. The battery pack as claimed in claim 1, wherein:
    the charge current path includes at least one second current limiter, the at least one second current limiter being configured to switch off a charge current when a second limit value is exceeded, and
    the at least one second current limiter is located in only the charge current path.

8. The battery pack as claimed in claim 7, wherein:
    the first switching element is arranged in the discharge current path; and
    the first switching element and the at least one second current limiter are connected in parallel.

9. The battery pack as claimed in claim 7, wherein the first switching element is configured to bypass the at least one second current limiter when the first switching element switches the discharge current path.

10. The battery pack as claimed in claim 1, wherein the first switching element is configured to switch between (i) the charge current path, (ii) the discharge current path, and (iii) a neutral state, the at least one battery cell being is electrically isolated from at least one of the first contact element and second contact element in the neutral state.

11. The battery pack as claimed in claim 1, wherein the at least one first current limiter is at least one of a bipolar transistor (BJT), a field-effect transistor (FET), and a metal-oxide-semiconductor field effect transistor (MOSFET).

12. A hand-held power tool comprising:
    an electric motor;
    a battery pack comprising (i) a battery pack housing with an interface configured to establish a mechanical and electrical connection of the battery pack to at least one of the hand- held power tool and a charging device, the interface having at least a first contact element and a second contact element configured to make electrical contact with at least one of corresponding mating contact elements on the hand-held power tool and corresponding mating contact elements on the charging device, (ii) at least one battery cell, (iii) a battery pack electronics system having a charge current path and a discharge current path, the charge current path being configured to connect the first contact element and the second contact element to the at least one battery cell during a charging of the at least one battery cell, the discharge current path being configured to connect the first contact element and the second contact element to the at least one battery cell during a discharging of the at least one battery cell, the charge current path and the discharge current path being at least partially electrically separated from each other, and (iv) a first switching element configured to switch between at least the charge current path and the discharge current path, wherein the interface comprises a first mechanism configured to actuate the first switching element, the first mechanism being integrated into the interface of the battery pack such that the first mechanism actuates the first switching element when the battery pack is connected to a corresponding interface of at least one of the hand-held power tool and charging device via the interface; and a machine-side interface configured to mechanically and electrically couple the hand-held power tool to the interface of the battery pack, the machine-side interface being configured such that the first mechanism of the battery pack switches the discharge current path via the first switching element when the battery pack is connected to the machine-side interface, wherein the charge current path and the discharge current path have a common portion and the common portion includes at least one first current limiter, wherein the at least one first current limiter is configured to switch off a discharge current when a first limit value is exceeded, wherein the at least one first current limiter includes a first metal-oxide-semiconductor field effect transistor (MOSFET) and a second MOSFET connected in parallel, and wherein a first parasitic body diode of the first MOSFET and a second parasitic body diode of the second MOSFET are configured to allow current flow in a direction of the charging current even when the first current limiter switches off the discharge current.

13. The battery pack as claimed in claim 3, wherein the battery back is electrically charged by the charging device, the charging device comprising:

a device-side interface configured to mechanically and electrically couple the charging device to the interface of the battery pack, the device-side interface being configured such that the first mechanism of the battery pack switches the charge current path via the first switching element when the battery pack is coupled to the device-side interface.

14. A tool system comprising:

a battery pack comprising (i) a battery pack housing with an interface configured to establish a mechanical and electrical connection of the battery pack to at least one of the hand-held power tool and a charging device, the interface having at least a first contact element and a second contact element configured to make electrical contact with at least one of corresponding mating contact elements on the hand-held power tool and corresponding mating contact elements on the charging device, (ii) at least one battery cell, (iii) a battery pack electronics system having a charge current path and a discharge current path, the charge current path being configured to connect the first contact element and the second contact element to the at least one battery cell during a charging of the at least one battery cell, the discharge current path being configured to connect the first contact element and the second contact element to the at least one battery cell during a discharging of the at least one battery cell, the charge current path and the discharge current path being at least partially electrically separated from each other, and (iv) a first switching element configured to switch between at least the charge current path and the discharge current path, wherein the interface comprises a first mechanism configured to actuate the first switching element;

the hand-held power tool comprising (i) an electric motor, and (ii) a machine-side interface configured to mechanically and electrically couple the hand-held power tool to the interface of the battery pack, the machine-side interface being configured such that the first mechanism of the battery pack switches the discharge current path via the first switching element when the battery pack is connected to the machine-side interface; and the charging device comprising a device-side interface configured to mechanically and electrically couple the charging device to the interface of the battery pack, the device-side interface being configured such that the first mechanism of the battery pack switches the charge current path via the first switching element when the battery pack is coupled to the device-side interface, wherein the charge current path and the discharge current path have a common portion and the common portion includes at least one first current limiter, wherein the at least one first current limiter is configured to switch off a discharge current when a first limit value is exceeded, wherein the at least one first current limiter includes a first metal-oxide-semiconductor field effect transistor (MOSFET) and a second MOSFET connected in parallel, and wherein a first parasitic body diode of the first MOSFET and a second parasitic body diode of the second MOSFET are configured to allow current flow in a direction of the charging current even when the first current limiter switches off the discharge current.

15. The battery pack as claimed in claim 1, wherein the first limit value is at least one of a limit value of a discharge current and a limit value of a temperature.

16. The battery pack as claimed in claim 7, wherein the second limit value is at least one of a limit value of a charge current, a limit value of a temperature, and a limit value of a cell voltage.

17. The battery pack as claimed in claim 7, wherein the at least one second current limiter is at least one of a bipolar transistor (BJT), a field-effect transistor (FET), and a metal-oxide-semiconductor field effect transistor (MOSFET).

18. The battery pack as claimed in claim 7, wherein:

the second current limiter includes a third MOSFET and a third parasitic body diode of the third MOSFET, and the third parasitic body diode has an opposite polarity of the first and second parasitic body diodes.

\* \* \* \* \*